United States Patent
Lancioni et al.

(10) Patent No.: US 11,616,797 B2
(45) Date of Patent: Mar. 28, 2023

(54) LARGE SCALE MALWARE SAMPLE IDENTIFICATION

(71) Applicant: McAfee, LLC, San Jose, CA (US)

(72) Inventors: German Lancioni, San Jose, CA (US); Jonathan B. King, Hillsboro, OR (US); Steven Grobman, Flower Mound, TX (US)

(73) Assignee: McAfee, LLC, San Jose, CA (US)

( * ) Notice: Subject to any disclaimer, the term of this patent is extended or adjusted under 35 U.S.C. 154(b) by 366 days.

(21) Appl. No.: 16/863,806

(22) Filed: Apr. 30, 2020

(65) Prior Publication Data

US 2021/0344696 A1 Nov. 4, 2021

(51) Int. Cl.
*H04L 29/06* (2006.01)
*H04L 9/40* (2022.01)
*G06F 16/245* (2019.01)
*G06F 16/28* (2019.01)
*G06F 16/22* (2019.01)

(52) U.S. Cl.
CPC ...... *H04L 63/1425* (2013.01); *G06F 16/2255* (2019.01); *G06F 16/245* (2019.01); *G06F 16/285* (2019.01); *H04L 63/1416* (2013.01)

(58) Field of Classification Search
CPC ............. H04L 63/1425; H04L 63/1416; G06F 16/2255; G06F 16/245; G06F 16/285; G06F 21/568; G06F 21/564
See application file for complete search history.

(56) References Cited

U.S. PATENT DOCUMENTS

| 7,461,392 | B2 | | 12/2008 | Herley | |
|---|---|---|---|---|---|
| 8,499,167 | B2 | | 7/2013 | Malanov | |
| 9,792,289 | B2 | * | 10/2017 | Reininger | ............. G06T 11/206 |
| 10,003,664 | B2 | | 6/2018 | Wang et al. | |
| 10,437,996 | B1 | * | 10/2019 | Li | ............. G06F 16/245 |
| 11,151,250 | B1 | * | 10/2021 | Chang | ............. G06F 21/565 |

(Continued)

OTHER PUBLICATIONS

Cohen, Y., et al., "Scalable Detection of Server-Side Polymorphic Malware," Knowledge-Based Systems; vol. 156; pp. 113-128 (May 19, 2018).

(Continued)

*Primary Examiner* — Taghi T Arani
*Assistant Examiner* — Lin Chang
(74) *Attorney, Agent, or Firm* — Patent Capital Group (57) ABSTRACT

A method including receiving a feature vector of an unknown sample, computing a MinHash of the unknown sample based on Jaccard-compatible features, querying a Locality Sensitive Hashing forest of known samples with the MinHash of the unknown sample to identify a first subset of known samples that are similar to the unknown sample, receiving for each individual known sample in the first subset, a feature vector including non-Jaccard distance-compatible features, computing a first sub-distance and a second sub-distance between the unknown sample and the known samples in the first subset, calculating a total distance for each known sample in the first subset by combining the first and the second sub-distances, identifying, based on the calculated total distances, a second subset of known samples that are most similar to the unknown sample, and classifying the unknown sample based on the second subset.

20 Claims, 7 Drawing Sheets

(56) References Cited

U.S. PATENT DOCUMENTS

| | | | |
|---|---|---|---|
| 2002/0083060 | A1 | 6/2002 | Wang et al. |
| 2009/0192640 | A1 | 7/2009 | Wold |
| 2013/0262489 | A1* | 10/2013 | Shirakawa ........ G06F 16/24558 707/756 |
| 2015/0067839 | A1 | 3/2015 | Wardman et al. |
| 2018/0241762 | A1* | 8/2018 | Savalle ................. G06N 3/006 |
| 2018/0349470 | A1* | 12/2018 | Urmanov ................ G06F 17/16 |
| 2019/0012460 | A1* | 1/2019 | Hartnett ............... G06F 21/566 |
| 2019/0026466 | A1* | 1/2019 | Krasser .................... G06N 3/08 |
| 2019/0199736 | A1* | 6/2019 | Howard ................ G06N 20/00 |
| 2020/0053104 | A1* | 2/2020 | El-Moussa .............. G06N 3/04 |
| 2021/0249102 | A1* | 8/2021 | Hurwitz ................ G16B 30/00 |

OTHER PUBLICATIONS

Dolev, S., et al., "Relationship of Jaccard and Edit Distance in Malware Clustering and Online Identification (Extended Abstract)," IEEE 16th International Symposium on Network Computing and Applications (NCA); 6 pages (Oct. 30, 2017).

Jang, J., "Scaling Software Security Analysis to Millions of Malicious Programs and Billions of Lines of Code," Theses and Dissertations; Carnegie Mellon University; 178 pages (Jan. 1, 2013).

* cited by examiner

LARGE SCALE MALWARE SAMPLE IDENTIFICATION

TECHNICAL FIELD

This disclosure relates in general to computer security and, more particularly though not exclusively, to a system and method for identifying an unknown malware sample in a large scale data structure.

BACKGROUND

The field of computer security has become increasingly important in today's society. While the use of computer networks has transformed business and personal communications, it has also been used as a vehicle for malicious operators to gain unauthorized access to computers for malicious disclosure of sensitive information. The number of cyberattacks, including malware campaigns that target networked user devices as well as networked computers in corporate organizations, continue to increase year after year. Cyber criminals have become more sophisticated in adapting their tactics and in effecting malware attacks to infiltrate and hijack computer systems. Techniques have been developed to identify unknown malware (e.g., new and modified malware) by comparing the unknown malware to known malware to find a match or a most similar match. However, identifying unknown malware quickly and accurately is challenging due to the vast amounts of malware.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

An apparatus, including systems and methods, for identifying an unknown sample based on its similarity to known samples in a large-scale database is disclosed herein. For example, a first subset of similar samples may be determined from a universe of known samples by querying a MinHash Locality Sensitive Hashing (LSH) Forest based on Jaccard-compatible features, and a second subset of most similar samples may be determined from the first subset based on a total distance calculated by combining non-Jaccard-compatible sub-distance calculations between the unknown sample and the known samples in the first subset. In some embodiments, an apparatus having a memory element operable to store instructions, and a processor, operable to execute the instructions, is configured to receive a feature vector of an unknown sample, where the feature vector includes Jaccard-compatible features (e.g., Categorical or Boolean features) and non-Jaccard distance-compatible features for computing numerical distances (e.g., Euclidean, Hamming, or other numerically-based features for computing non-Jaccard sub-distances), compute a Minimum Hash (MinHash) of the unknown sample based on the Jaccard-compatible features, query a MinHash LSH Forest of known samples with the MinHash of the unknown sample to identify a first subset of known samples that are similar to the unknown sample, receive a feature vector having non-Jaccard distance-compatible features for each sample in the first subset, compute sub-distances between the unknown sample and each sample in the first subset, calculate overall distances between the unknown sample and each sample in the first subset based on the sub-distances, identify, based on the overall distances between the unknown sample and each sample in the first subset, a second subset of known samples that are most similar to the unknown sample, and classify the unknown sample based on the second subset of known samples.

Currently, approximately one million unknown malware samples are processed for identification every day. Although brute force comparisons provide the most accurate results, the brute force method is not scalable and the vast number of samples (e.g., the quantity of one-to-one comparisons) make applying this method impractical. Comparatively, although traditional clustering approach, such as k-means, is more efficient than the brute force approach, it is less accurate. These current methods for identifying unknown malware require a choice between accuracy and efficiency. Beyond traditional malware identification, additional operations, such as relationship inference, attribution assessment, remediation extrapolation, and polymorphism identification, may be performed to classify and to extrapolate information regarding the unknown malware sample. These operations usually require the ability to group or cluster malware, so that extrapolation of information may be performed efficiently. The challenges encountered when applying the clustering method include a difficulty in scaling given the vast amount of data, the loss of resolution through dimensionality reduction, and lack of distinction in distance computations because distances are calculated without considering the domain-specific properties of the different data types. Further, the clustering method relies exclusively on Euclidean distances so it is less accurate as it cannot take advantage of the other attributes of a feature vector and requires continuous cluster quantity and size tuning. A system and method that timely and accurately delivers, from a vast number of known samples, a set of known samples that are most similar to an unknown sample may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. Although certain elements may be referred to in the singular herein, such elements may include multiple sub-elements. As used herein, the term "sample" refers to a representative part or a single item from a larger whole or group, or a portion of the representative part or of the single item from the larger whole or group. For example, a sample may refer to individual malware from a malware database, or may refer to a portion of the individual malware. In another example, a sample may refer to a recorded song or may refer to an excerpt of the recorded song. As used herein, "malware" and "malware sample" may be used interchangeably.

Figure 1:
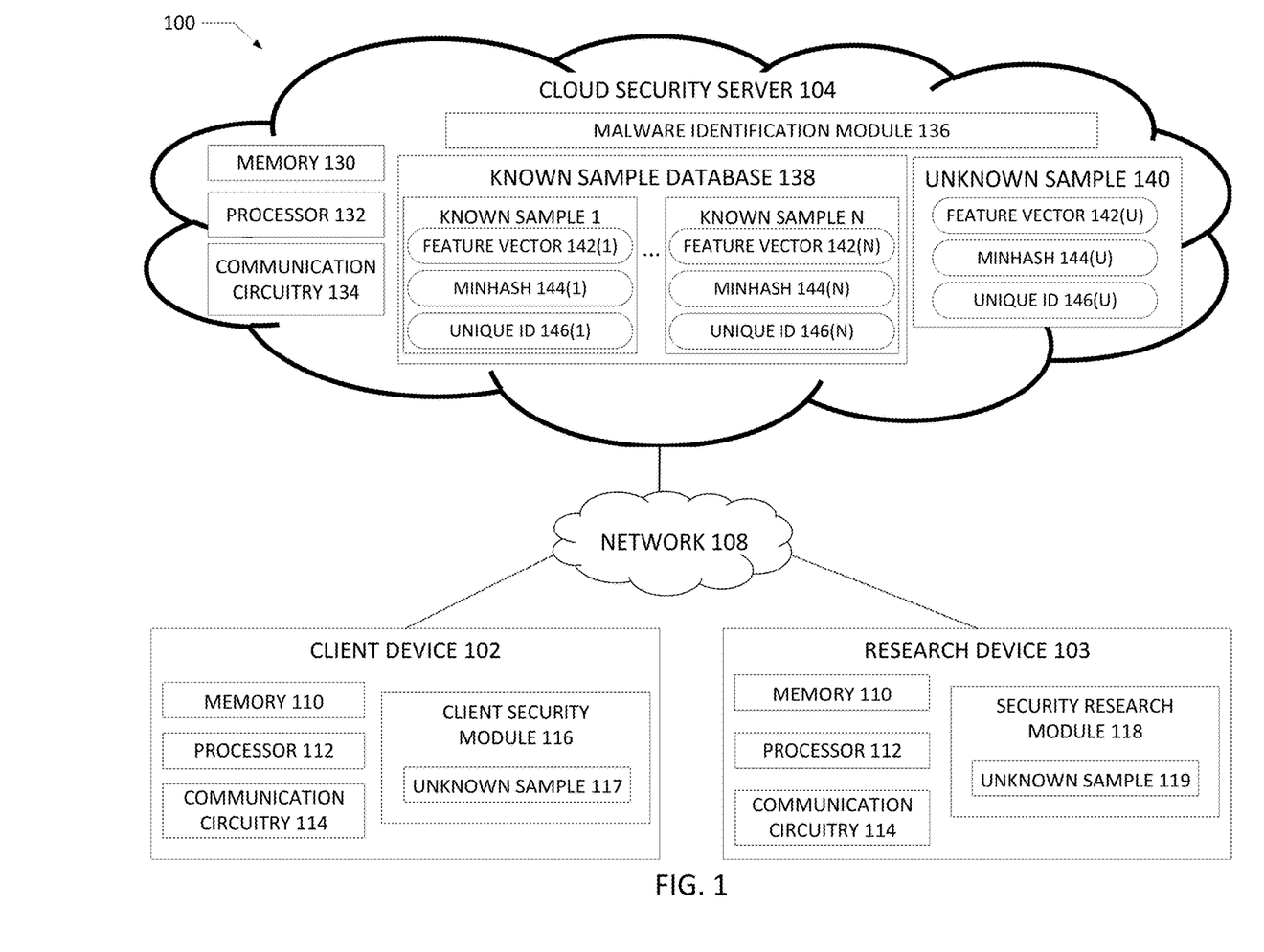
FIG. 1 is a simplified block diagram of an example system for identifying an unknown sample, in accordance with an embodiment of the present disclosure.

FIG. 1 is a simplified block diagram of a communication system 100 that enables identification and classification of an unknown sample in a large scale data system, in accordance with an embodiment of the present disclosure. The communication system 100 may be configured to timely and accurately identify an unknown sample by applying a hybrid system that combines MinHash Locality Sensitive Hashing using a subset of Jaccard-compatible attributes to build a forest for performing coarse queries and a total distance using multiple non-Jaccard distance-compatible attributes for refining the results from the forest queries for accuracy. The communication system 100 disclosed herein may be configured to identify an unknown sample nearly as accurately as the brute force approach but with the ability to scale, and without the performance penalization that brute force approach would incur, and without the constant cluster quantity and size tuning required by traditional clustering approaches.

As illustrated in FIG. 1, an embodiment of communication system 100 may include a client device 102, a research device 103, a cloud security server 104, and network 108. The client device 102 may include memory 110, a processor 112, communication circuitry 114, a client security module 116, and an unknown malware sample 117, where the client security module or other anti-malware software may have discovered the unknown malware sample 117. The research device 103 may include memory 110, a processor 112, communication circuitry 114, a security research module 118, and an unknown malware sample 119, where the security research module 118 may have discovered the unknown malware sample 119 by searching the dark web and/or known malicious websites. The cloud security server 104 may include memory 130, a processor 132, communication circuitry 134, a malware identification module 136, a known malware sample database 138, and an unknown malware sample 140. The known malware sample database 138 may include a plurality of known malware samples (e.g., a number of samples from 1 through N), where an individual malware sample includes a feature vector 142, a MinHash 144, and a unique identifier 146. The unknown malware sample 140 may include a feature vector 142(U), a MinHash 144(U), and a unique identifier 146(U), such as a hash function. The unknown malware sample 140 may be received from the client device 102 or from the research device 103, or may have been discovered by the cloud security server 104. The malware identification module 136 may receive the individual feature vectors 142 having distance features and Jaccard features, may calculate the individual MinHash 145 based on the Jaccard features, may build an individual MinHash LSH Forest based on the MinHash 145, and may calculate a unique identifier 146 (e.g., a hash) for each malware sample of the plurality of malware samples 138 and for the unknown malware sample 140. The malware identification module 136 may query the MinHash LSH Forest of the known samples 138 with the MinHash 144(U) of the unknown sample 140 to find a subset of approximate similar known samples (i.e., Subset Q), and, then, may calculate total distance values based on non-Jaccard distance-compatible features to determine the most similar known samples 138 in the Subset Q to the unknown sample 140 and create a subset of most similar samples (i.e., Subset X), as described in detail below with reference to FIG. 2. The malware identification module 136 may identify or classify the unknown sample 140 using the subset of most similar samples (i.e., Subset X). As used herein, the terms "identify the unknown sample" and "classify the unknown sample" may be used interchangeably. The client device 102, the research device 103, and the cloud security server 104 may be in communication using network 108.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the user device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The communication circuitry 114 may be used to send and receive commands, requests, and other data to and from the client device 102. The client security module 116 may be connected to the processor 112, the memory 110, and the communication circuitry 114 to perform the operations described herein.

The client device 102 may include the client security module 116 to protect the client device 102 from cyber-attacks. The client security module 116 may include an anti-malware software or cyber security computer program, such as McAfee® Total Protection, to detect malware or potential malware on the client device 102. Client security module 116 may be configured to manage security for the client device 102. For example, the client security module 116 may detect potential malware (e.g., the unknown sample 117), may segregate the unknown sample 117 and associated processes, may store the unknown sample 117 in memory 110, and may communicate the unknown sample 117 to the cloud security server 104 for identification and/or classification by the malware identification module 136.

The research device 103 may be a network element and include, for example, servers, desktop computers, laptop computers, or other similar devices. The research device 103 also may be referred to herein as "research server" or "security research device." The research device 103 may include one or more processors 112 for executing any type of instructions associated with the user device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The communication circuitry 114 may be used to send and receive commands, requests, and other data to and from the research device 103. The security research module 118 may be connected to the processor 112, the memory 110, and the communication circuitry 114 to perform the operations described herein.

The research device 103 may include the security research module 118. The security research module 118 may be configured to manage security for the research device 103 and to discover new cyber-attacks and malware. For example, the security research module 118 may search the dark web and known malicious websites to detect potential threats (e.g., the unknown sample 119), may store the unknown sample 119 in memory 110, and may communicate the unknown sample 119 to the cloud security server 104 for identification and/or classification by the malware identification module 136.

Cloud security server 104 may include memory 130, a processor 132, communication circuitry 134, a malware identification module 136, a known malware sample database 138, and an unknown sample 140. The processor 132 is connected to memory 130 and communication circuitry 134. The processor 132 may be based on one or more processors, microcontrollers, microprocessors, and programmable logic devices, among others. Memory 130 may store computer executable instructions or computer executable components as well as other data. The processor 132 executes computer executable instructions stored in memory 130. The communication circuitry 134 may be used to send and receive commands, requests, and other data to and from the cloud security server 104. The malware identification module 136 may be connected to the processor 132, the memory 130, the communication circuitry 134, the known sample database 138, and the unknown sample 140 to perform the operations described herein. The known sample database 138 and/or the unknown sample 140 may be stored in memory 130.

The malware identification module 136 may receive, from the client device 102 and/or the research device 103, unknown malware samples 117, 119, respectively, and may analyze the unknown malware samples 117, 119 to identify malware associated with exploitative/rogue applications and processes. The malware identification module 136 may send, to the client device 102, the results of the analysis (e.g., the assigned identification and classification of the unknown sample), and may recommend a remediation and/or a corrective action.

The one or more processors 112 of the client device 102 and the research device 103 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102 and the research device 103 may include a chipset (not shown) for controlling communications between one or more processors and one or more of the other components of the device. The processors 112 may also include one or more application specific integrated circuits (ASICs) or application specific standard products (ASSPs) for handling specific data processing functions or tasks.

The client device 102 and the research device 103 may include one or more memory elements 110 for storing information and data. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems (O/S) application software.

The client device 102 and the research device 103 may include communication circuitry 114. The communication circuitry 114 may be embodied as any communication circuitry, device, or collection thereof, capable of enabling communications between the client device 102 and the research device 103, and between the client device 102 or the research device 103 other remote devices (e.g., the remote malware identification module 136). The terms "communication circuitry" and "input/output (I/O) circuitry" may be used interchangeably herein. The communication circuitry 114 may be configured to use any one or more communication technology (e.g., wireless or wired communications) and associated protocols (e.g., Ethernet, Bluetooth®, Wi-Fi®, WiMAX, etc.) to effect such communication. The client device 102 and the research device 103 may further include GPS and other location identifiers. The client device 102 and the research device 103 may further include peripheral devices (not shown), which may include any number of additional peripheral or interface devices and associated I/O circuitry, such as speakers, microphones, additional storage devices, among others.

Network 108 represents interconnected communication paths for receiving and transmitting packets of information that propagate through the communication system 100. Network 108 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In communication system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the cloud security server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 2:
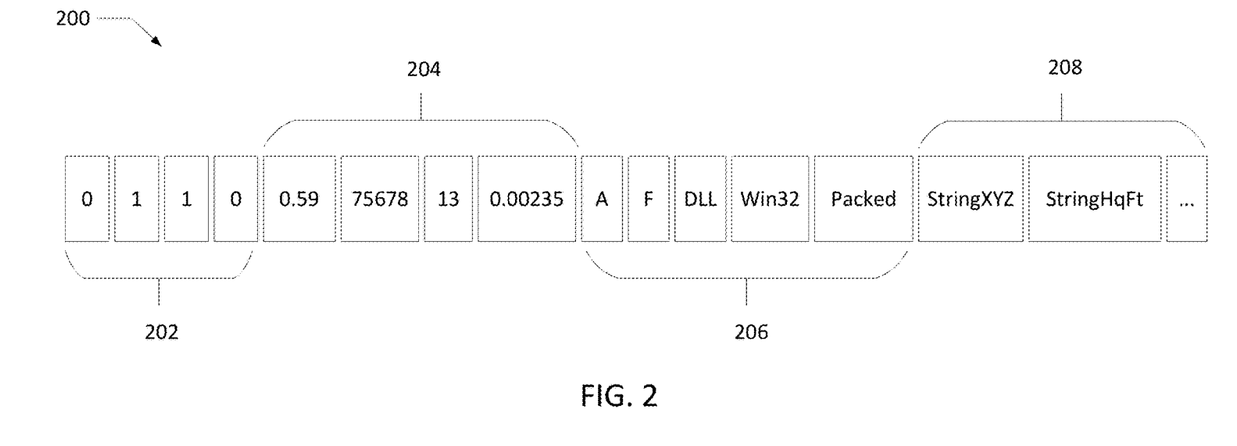
FIG. 2 is a simplified block diagram illustrating potential operations that may be associated with identifying an unknown sample, in accordance with an embodiment of the present disclosure.

FIG. 2 is an exemplary feature vector of a malware sample, in accordance with an embodiment of the present disclosure. A feature vector uniquely identifies a malware sample based on the attributes of the malware sample. As shown in FIG. 2, a feature vector 200 may include different attributes (i.e., data types) obtained from a malware sample. For example, the feature vector 200 includes Hamming-compatible attributes 202, Euclidean-compatible attributes 204, Jaccard-compatible attributes 206, and other non-Jaccard distance-type attributes 208, such as string features (e.g., String XYZ and StringHqFt) that may be compared using a Levenshtein Distance calculation. These different attributes or data types also may be referred to herein as "sub-attributes." The Jaccard-compatible attributes are non-numerical values and describe other properties of the known malware sample. For example, the Jaccard properties may define what operating system the malware is designed to infiltrate, whether the malware is an executable or another file type, what the file type is, and whether the malware is packed or unpacked, among others. The Jaccard-compatible attributes 206 may be extracted into a sub-vector and a MinHash may be computed. The malware sample also may be identified by a unique identifier, such as a hash (e.g., a MD5 hash equal to 32dab76a89b004ce4a3465661c000af3). The MinHash may be used to build a MinHash LSH Forest, where the sample hash (i.e., the unique identifier) is used as the index and the sub-vector MinHash is used as the input for the trees. This may be repeated for all the known samples to complete the MinHash LSH Forest. Once the MinHash LSH Forest is complete, the forest may be queried using an unknown malware sample.

The Hamming-compatible 202, the Euclidean-compatible 204, and the other non-Jaccard distance-type attributes 208 are numerical values that may be used to calculate sub-distances between a malware sample and an unknown malware sample. For example, the Euclidean-compatible attributes of the malware sample and of an unknown malware sample may be used to calculate Euclidean sub-distances between the malware sample and the unknown malware sample. Similarly, the Hamming-compatible attributes of the malware sample and of an unknown malware sample may be used to calculate Hamming sub-distances between the malware sample and the unknown malware sample. Likewise, string samples of the malware sample and of an unknown malware sample may be used to calculate string feature sub-distances between the malware sample and the unknown malware sample. A total distance, such as a Custom Distance Metric (CDM), may be calculated by combining two or more of the calculated sub-distances. For example, the Euclidean formula may be applied to integrate the various sub-distances, where each point in space is a previously computed sub-distance. The total distance is a standardized numerical representation of how similar, or dissimilar, a known malware sample is to the unknown malware sample. As used herein, the terms "total distance," "final distance," and "overall distance" may be used interchangeably. For example, the total distance may combine the sub-distances computed for each of the non-Jaccard distance-compatible attributes of the feature vector into a standardized distance measurement that enables a one-to-one comparison to identify the known samples that are most similar to the unknown sample. A lower total distance value indicates that the known malware sample is more similar to the unknown malware sample. In some embodiments, the total distance may be determined by combining two or more of the Euclidean sub-distances, the Hamming sub-distances, and the string sample sub-distances. In some embodiments, the total distance may be based on different non-Jaccard distance-type attributes.

In some embodiments, the total distance may be calculated to assign more weight to a first sub-distance and less weight to a second sub-distance (e.g., calculated based on a weighted combination of sub-distances), such that the total distance value may be customized to prioritize specific distance attributes over others. Some non-Jaccard distance-type attributes may be assigned more weight because they are more important. Some non-Jaccard distance-type attributes may be assigned more weight because they are more difficult to alter. For example, file size may be a non-Jaccard distance-type attribute that is assigned less weight because the file size is easy to change. In another example, an indicator of a compiler used to compile an executable file may be a Jaccard distance-type attribute that is assigned more weight, especially if the compiler is an unusual compiler, because the compiler is difficult to modify and is more likely to be a substantial indicator of the overall probability of similarity. The one-to-one comparison of the total distances of the approximate similar known samples (e.g., Subset Q) delivers more accurate results and, since the number of samples in Subset Q is small compared to the universe of known samples N, it also delivers faster results.

Although FIG. 2 illustrates a feature vector of a malware sample, a feature vector may be created for various types of samples including a song, a movie, a television show, a document, or a website, among others. For example, a feature vector of a sample of a song may include non-Jaccard distance-compatible attributes, such as bits per minute and length of the song, and Jaccard-compatible attributes, such as the year the song was released, the songwriter, the singer, and the production company.

Figure 3:
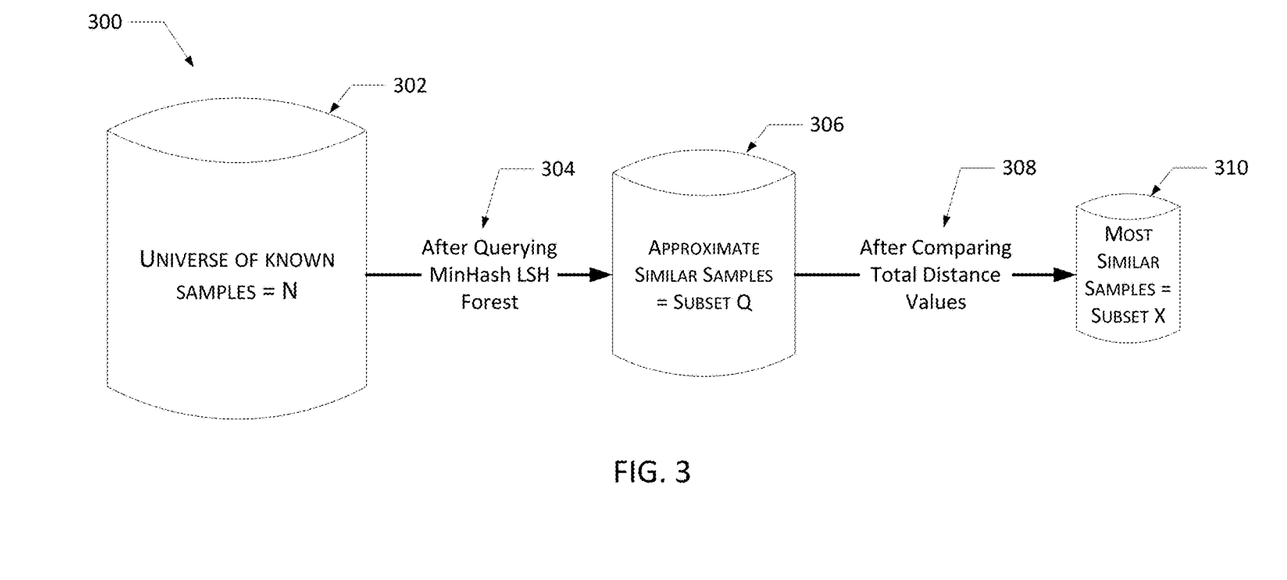
FIG. 3 is an exemplary feature vector of a sample, in accordance with an embodiment of the present disclosure.

FIG. 3 is a simplified block diagram illustrating potential operations that may be associated with identifying an unknown sample by creating subsets of approximately similar samples 306 and most similar samples 310 from a universe of known samples 302, in accordance with an embodiment. A MinHash LSH Forest may be built using the Jaccard-compatible attributes of the feature vectors of the universe of known samples 302 (e.g., set N), as described above with reference to FIG. 2. In some embodiments, the universe of known samples may be approximately one million samples, may be more than one million samples, may be approximately 500,000 samples, or may be between 500,000 and 1 million samples. The MinHash LSH Forest of known samples may be queried 304 with the MinHash of an unknown sample to identify a subset of approximate similar samples 306 (e.g., Subset Q). In some embodiments, the Subset Q of approximate similar samples may be approximately 500 samples, may be more than 1,000 samples, or may be between 300 and 600 samples. A total distance value (e.g., a CDM based on a combination of sub-distances) may be calculated from the non-Jaccard distance-compatible attributes of the feature vectors of the unknown sample and the known samples in Subset Q then compared to identify a subset of most similar samples (e.g., Subset X). In some embodiments, the Subset X may be identified by selecting the known samples having a total distance value equal to or less than a threshold value. For example, if the CDM produces a distance value between 0 and 1, where 0 indicates identical samples and 1 indicates very distant samples, then a threshold may be equal to or less than 0.25. In some embodiments, the Subset X may be identified by sorting the total distance values and selecting a number of known samples that are most similar. For example, selecting ten (10) known samples with the lowest total distance values. In some embodiments, the number of known samples in Subset X may be approximately 10 samples, may be between 15 and 25 samples, or may be less than 50 samples. The unknown sample may be identified and/or classified based on the Subset X of most similar samples by comparing the full feature vectors and finding the most common attributes. In some embodiments, the unknown sample may be classified by identifying the most common features of malware in the Subset X. In some embodiments, the unknown sample may be classified by identifying the features of the most similar malware samples in Subset X (e.g., classifying based on the three (3) most similar samples). In some embodiments, the unknown sample may be assigned multiple classifications (e.g., the unknown sample is classified as either "A" or "B" or "C"). In some embodiments, a processor at least partially in hardware may assign a classification to the unknown sample. In some embodiments, a human may assign a classification to the unknown sample. In some embodiments, a combination of a processor and a human may assign a classification to the unknown sample.

Figure 4:
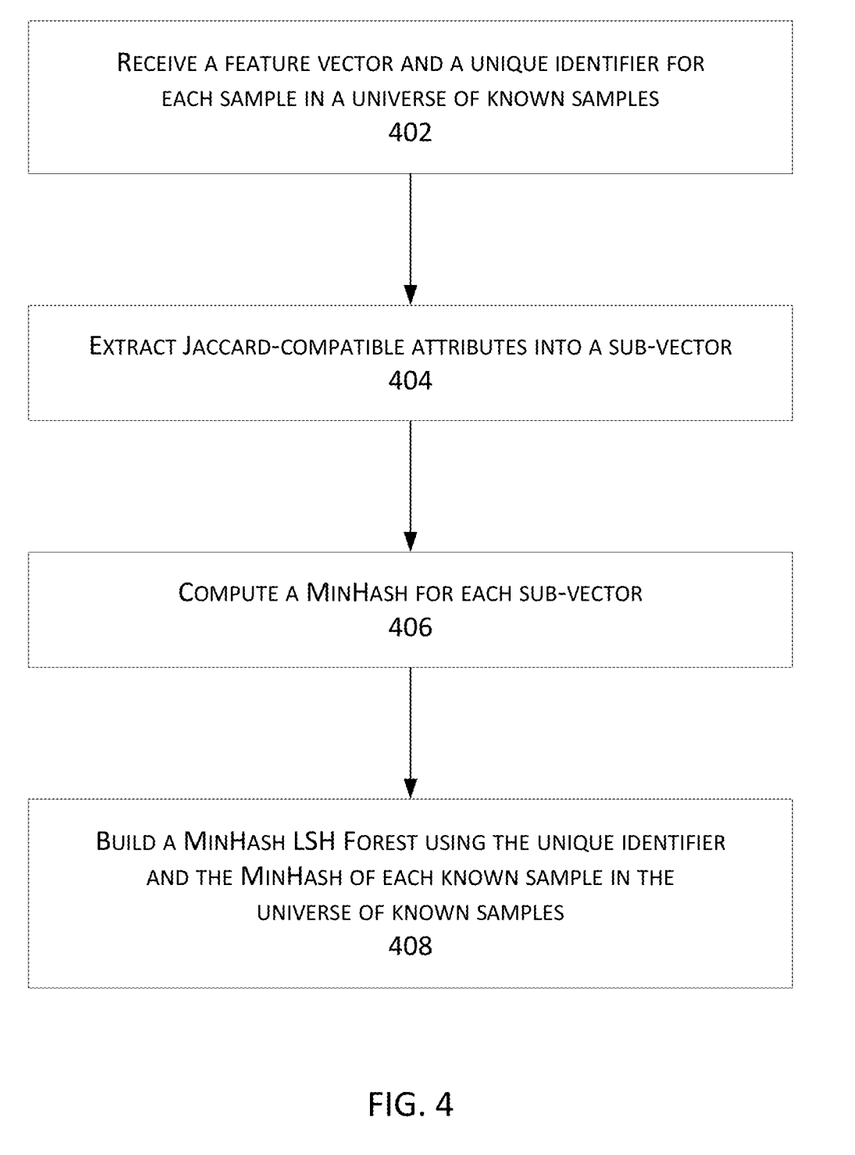
FIG. 4 is a simplified flowchart illustrating potential operations that may be associated with building a MinHash Locality Sensitive Hashing Forest of a universe of known samples, in accordance with an embodiment of the present disclosure.

FIG. 4 is a simplified flowchart illustrating potential operations that may be associated with building a MinHash LSH Forest using a universe of known samples, in accordance with an embodiment of the present disclosure. The one or more operations may be performed by the malware identification module 136. At 402, a feature vector and a unique identifier is received for each sample in a universe of known samples. The unique identifier may be calculated using a hash function, such as the MD5 hash algorithm. At 404, Jaccard-compatible attributes of the feature vector are extracted into a sub-vector for each sample in the universe of known samples. At 406, a MinHash is computed for each sub-vector. At 408, a MinHash LSH Forest is built using the unique identifier and the computed MinHash of each sample in the universe of known samples.

Figure 5:
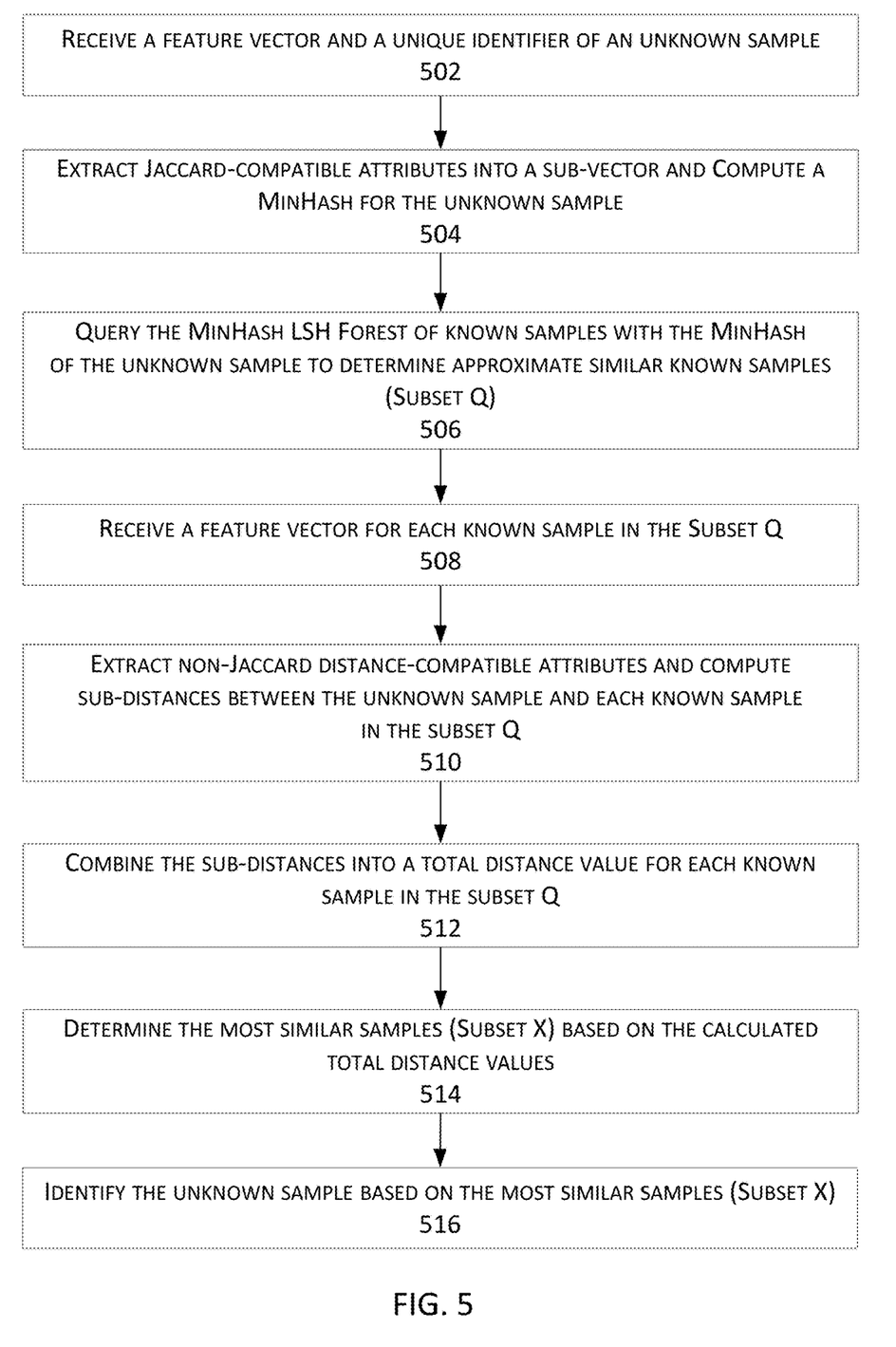
FIG. 5 is a simplified flowchart illustrating potential operations that may be associated with identifying an unknown sample from a universe of samples, in accordance with an embodiment of the present disclosure.

FIG. 5 is a simplified flowchart illustrating potential operations that may be associated with identifying an unknown sample from a universe of samples, in accordance with an embodiment of the present disclosure. The one or more operations may be performed by the malware identification module 136. At 502, a feature vector of an unknown sample is received. At 504, the Jaccard-compatible attributes are extracted from the feature vector and a MinHash is computed for the unknown sample. At 506, the MinHash LSH Forest of known samples is queried using the MinHash of the unknown sample to identify a set of approximate similar known samples (i.e., Subset Q). At 508, a feature vector is received for each known sample in the Subset Q. At 510, the non-Jaccard distance-compatible attributes are extracted from each feature vector and sub-distances are calculated between the unknown sample and each known sample in the Subset Q. At 512, the calculated sub-distances are combined into a final distance (e.g., a CDM) for each known sample in the Subset Q. At 514, a set of most similar known samples (Subset X) is identified based on the calculated total distances, where a lower total distance value indicates a more similar known sample. Subset X may be determined using any suitable technique. For example, as described above with reference to FIG. 3, Subset X may be determined based on a target number of most similar known samples, or may be determined based on a total distance being equal to or below a threshold value. At 516, the unknown sample is identified based on the most similar known samples in Subset X. For example, the unknown sample may be identified as described above with reference to FIG. 3.

Figure 6:
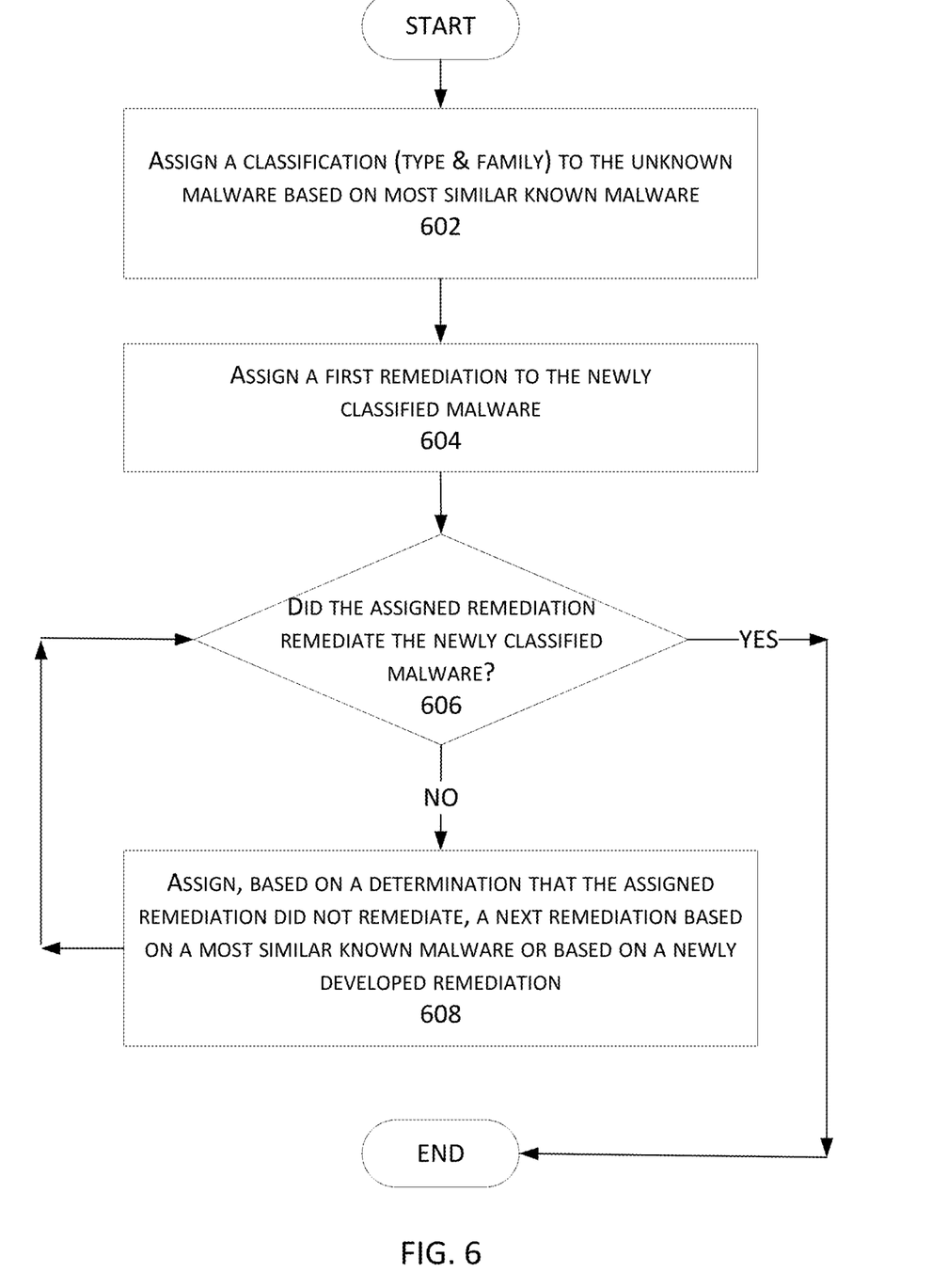
FIG. 6 is a simplified flowchart illustrating potential operations that may be associated with including a newly identified sample to a universe of samples, in accordance with an embodiment of the present disclosure.

FIG. 6 is a simplified flowchart illustrating potential operations that may be associated with assigning a corrective action to a newly identified malware sample, in accordance with an embodiment of the present disclosure. The one or more operations may be performed by the client security module 116, the security research module 118, the malware identification module 136, or by a combination of the client security module 116 and the malware identification module 136. In some embodiments, a user of the client device 102 may be prompted to perform the remediation or take corrective action. At 602, the unknown sample may be assigned a classification based on the most similar known samples of Subset X as described above with reference to FIG. 3. Example classifications may include a type, a family, an author, and a source location (e.g., country or organization), among other classifications. The classifications may be used to identify whether the malware is part of a campaign, such as a nation state campaign or a crime organization campaign. The At 604, a remediation or other corrective action may be assigned to remediate the newly classified malware and may be based on a remediation that worked for a most similar known malware in the Subset X. At 606, a determination is made as to whether the assigned remediation remediated the newly classified malware. If the remediation remediated the newly classified malware, the process ends. If the remediation did not remediate the newly classified malware, then the process continues to 608. At 608, based on a determination that the newly classified malware was not remediation, a next remediation may be assigned. For example, the next remediation may be assigned based on another most similar known malware remediation or based on a remediation that was developed for the newly classified malware. The operations at 608 and 606 continue until the newly classified malware is remediated. In some embodiments, the remediation that worked to remediate the newly classified malware may be stored in memory and may be associated with newly classified malware.

Figure 7:
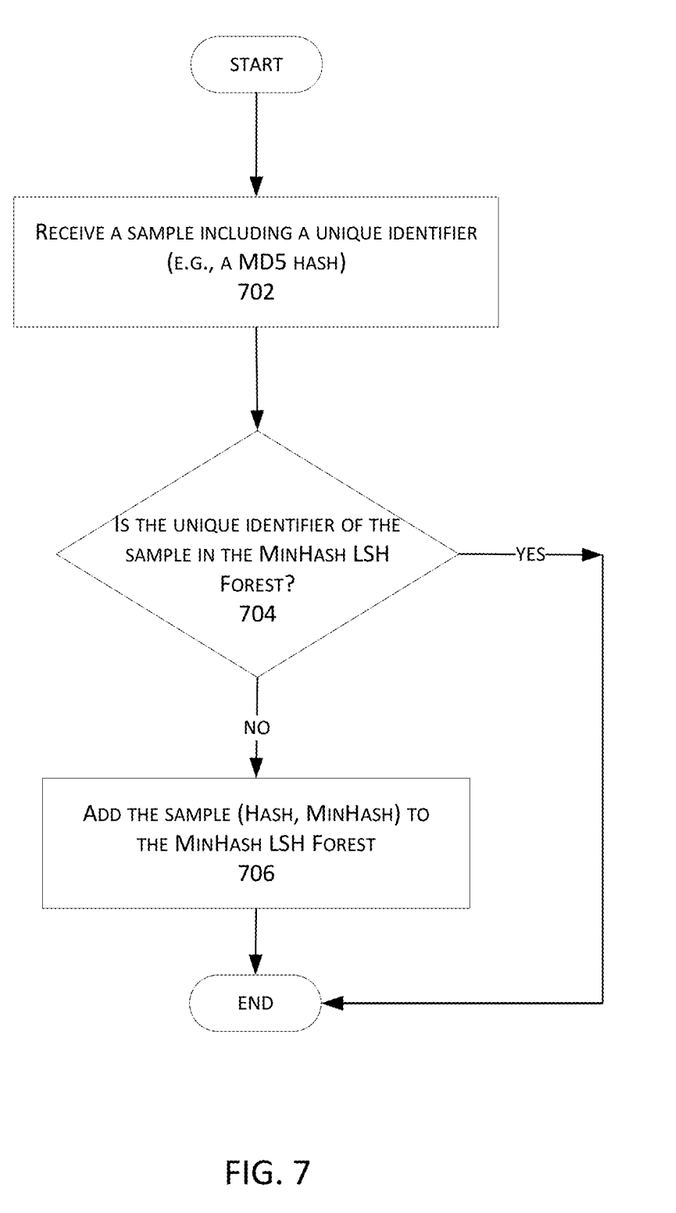
FIG. 7 is a simplified flowchart illustrating potential operations that may be associated with assigning a corrective action to a newly identified malware sample, in accordance with an embodiment of the present disclosure.

FIG. 7 is a simplified flowchart illustrating potential operations that may be associated with adding a sample to a universe of samples, in accordance with an embodiment of the present disclosure. The one or more operations may be performed by the malware identification module 136. At 702, a sample is received, including a unique identifier (e.g., a MD5 hash). The feature vector of the sample also may be received. In some embodiments, the malware identification module 136 may create the feature vector by extracting the features from the sample. In some embodiments, the sample may be an unknown sample, where the unique identifier is used to query the MinHash LSH Forest to determine whether the sample is known (e.g., included in the MinHash LSH Forest). If the sample is unknown (e.g., not included in the MinHash LSH Forest), the sample may be classified, as described above with reference to FIGS. 5 and 6. In some embodiments, the sample may be a newly classified sample (e.g., not included in the MinHash LSH Forest). At 704, a determination is made as to whether the unique identifier of the sample is included in the MinHash LSH Forest that was built based on the universe of known samples by querying the Forest index. If the unique identifier is included in the Forest, the process ends. If the unique identifier is not included, then the process proceeds to 706. At 706, the sample is added to the MinHash LSH Forest using its unique identifier and the Jaccard attributes of its feature vector.

Figure 8:
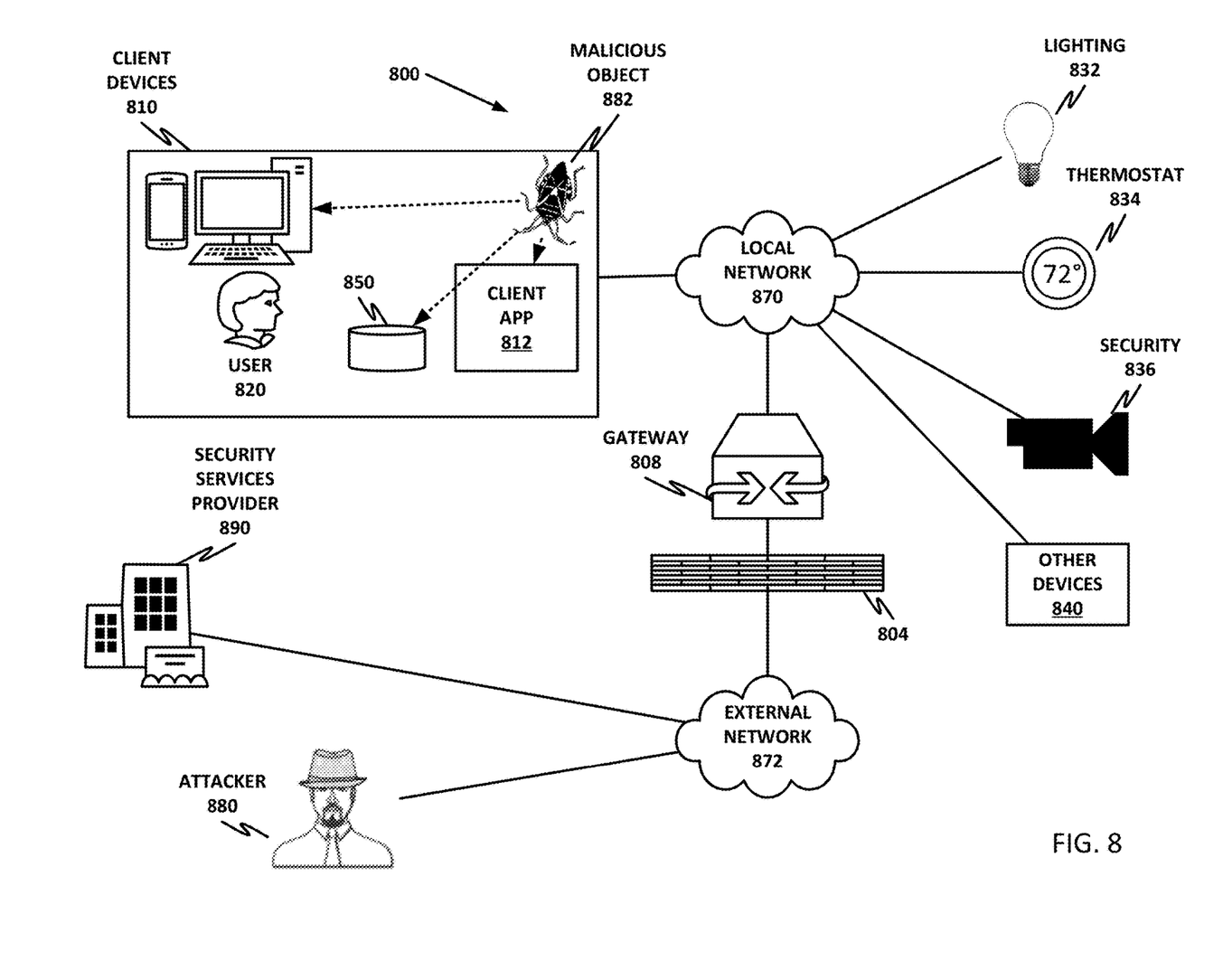
FIG. 8 is a block diagram of selected elements of a security ecosystem.

FIG. 8 is a block diagram of a security ecosystem 800. In the example of FIG. 8, security ecosystem 800 may be an enterprise, a government entity, a data center, a telecommunications provider, a "smart home" with computers, smart phones, and various internet of things (IoT) devices, or any other suitable ecosystem. Security ecosystem 800 is provided herein as an illustrative and nonlimiting example of a system that may employ, and benefit from, the teachings of the present specification.

Within security ecosystem 800, one or more users 820 operate one or more client devices 810. A single user 820 and single client device 810 are illustrated here for simplicity, but a home or enterprise may have multiple users, each of which may have multiple devices, such as desktop computers, laptop computers, smart phones, tablets, hybrids, or similar.

Client devices 810 may be communicatively coupled to one another and to other network resources via local network 870. Local network 870 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 870 may also include one or more servers, firewalls, routers, switches, security appliances, antivirus servers, or other network devices, which may be single-purpose appliances, virtual machines, containers, or functions. Some functions may be provided on client devices 810.

In this illustration, local network 870 is shown as a single network for simplicity, but in some embodiments, local network 870 may include any number of networks, such as one or more intranets connected to the internet. Local network 870 may also provide access to an external network, such as the internet, via external network 872. External network 872 may similarly be any suitable type of network.

Local network 870 may connect to the internet via gateway 808, which may be responsible, among other things, for providing a logical boundary between local network 870 and external network 872. Local network 870 may also provide services such as dynamic host configuration protocol (DHCP), gateway services, router services, and switching services, and may act as a security portal across local boundary 804.

In some embodiments, gateway 808 may be a standalone internet appliance. Such embodiments are popular in cases in which ecosystem 800 includes a home or small business. In other cases, gateway 808 may run as a virtual machine or in another virtualized manner. In larger enterprises that features service function chaining (SFC) or network function virtualization (NFV), gateway 808 may be include one or more service functions and/or virtualized network functions.

Local network 870 may also include a number of discrete IoT devices. For example, local network 870 may include IoT functionality to control lighting 832, thermostats or other environmental controls 834, a security system 836, and any number of other devices 840. Other devices 840 may include, as illustrative and nonlimiting examples, network attached storage (NAS), computers, printers, smart televisions, smart refrigerators, smart vacuum cleaners and other appliances, and network connected vehicles.

Local network 870 may communicate across local boundary 804 with external network 872. Local boundary 804 may represent a physical, logical, or other boundary. External network 872 may include, for example, websites, servers, network protocols, and other network-based services. In one example, an attacker 880 (or other similar malicious or negligent actor) also connects to external network 872. A security services provider 890 may provide services to local network 870, such as security software, security updates, network appliances, or similar. For example, MCAFEE, LLC provides a comprehensive suite of security services that may be used to protect local network 870 and the various devices connected to it.

It may be a goal of users 820 to successfully operate devices on local network 870 without interference from attacker 880. In one example, attacker 880 is a malware author whose goal or purpose is to cause malicious harm or mischief, for example, by injecting malicious object 882 into client device 810. Once malicious object 882 gains access to client device 810, it may try to perform work such as social engineering of user 820, a hardware-based attack on client device 810, modifying storage 850 (or volatile memory), modifying client application 812 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 880 to leverage against local network 870.

Malicious harm or mischief may take the form of installing root kits or other malware on client devices 810 to tamper with the system, installing spyware or adware to collect personal and commercial data, defacing websites, operating a botnet such as a spam server, or simply to annoy and harass users 820. Thus, one aim of attacker 880 may be to install his malware on one or more client devices 810 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 880 may also want to commit industrial or other espionage, such as stealing classified or proprietary data, stealing identities, or gaining unauthorized access to enterprise resources. Thus, attacker's strategy may also include trying to gain physical access to one or more client devices 810 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 880. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 870 may contract with or subscribe to a security services provider 890, which may provide security services, updates, antivirus definitions, patches, products, and services. MCAFEE, LLC is a nonlimiting example of such a security services provider that offers comprehensive security and antivirus solutions. In some cases, security services provider 890 may include a threat intelligence capability such as McAfee's GTI database, or similar product. Security services provider 890 may update its threat intelligence database by analyzing new candidate malicious objects as they appear on client networks and characterizing them as malicious or benign.

Other security considerations within security ecosystem 800 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

EXAMPLE IMPLEMENTATIONS

The following paragraphs provide various examples of the embodiments disclosed herein.

Example 1 is an apparatus, including a memory element operable to store instructions; and a processor operable to execute the instructions, such that the apparatus is configured to receive a feature vector of an unknown sample, wherein the feature vector includes Jaccard-compatible features and non-Jaccard distance-compatible features; compute a MinHash of the unknown sample based on the Jaccard-compatible features; query a MinHash Locality Sensitive Hashing (LSH) Forest of known samples with the MinHash of the unknown sample to identify a first subset of known samples that are similar to the unknown sample; receive, for each individual known sample in the first subset, a feature vector having non-Jaccard distance-compatible features; compute, for each individual known sample in the first subset, a first sub-distance between the unknown sample and the known sample using a first non-Jaccard distance-compatible feature and a second sub-distance between the unknown sample and the known sample using a second non-Jaccard distance-compatible feature; calculate, for each individual known sample in the first subset, an overall distance between the unknown sample and the known sample by combining the first and the second sub-distances; identify, based on the overall distance between the unknown sample and each individual known sample in the first subset, a second subset of known samples that are most similar to the unknown sample; and classify the unknown sample based on the second subset of known samples.

Example 2 may include the subject matter of Example 1, and may be further configured to assign a remediation to the classified unknown sample.

Example 3 may include the subject matter of any of Examples 1 and 2, and may further specify that the unknown sample and the known samples are malware.

Example 4 may include the subject matter of any of Examples 1-3, and may further specify that identifying the second subset of known samples includes selecting the known samples having the overall distance that is equal to or less than a threshold.

Example 5 may include the subject matter of any of Examples 1-4, and may further specify that identifying the second subset of known samples includes selecting a number of known samples with the lowest overall distance.

Example 6 may include the subject matter of any of Examples 1-5, and may further specify that a number of known samples in the second subset is between 10 and Example 25.

Example 7 may include the subject matter of any of Examples 1-6, and may further specify that a number of known samples in the first subset is between 250 and Example 500.

Example 8 may include the subject matter of any of Examples 1-7, and may further specify that the first non-Jaccard distance-compatible feature is Euclidean-compatible and the second non-Jaccard distance-compatible feature is Hamming-compatible.

Example 9 may include the subject matter of any of Examples 1-8, and may be further configured to receive a unique identifier of the unknown sample; query an index of the MinHash LSH Forest using the unique identifier to determine whether the unknown sample is in the MinHash LSH Forest; and add the unknown sample to the MinHash LSH Forest based on a determination that the unknown sample is not in the MinHash LSH Forest.

Example 10 is at least one non-transitory computer-readable medium including one or more instructions that when executed by a processor, cause the processor to receive a feature vector of an unknown malware, wherein the feature vector includes Jaccard-compatible features, a first non-Jaccard sub-distance feature, and a second non-Jaccard sub-distance feature; compute a MinHash of the unknown malware; identify a first subset of known malware, wherein identifying the first subset includes querying a MinHash Locality Sensitive Hashing (LSH) Forest of known malware with the MinHash of the unknown malware; receive a feature vector for each individual known malware in the first subset, wherein the feature vector includes a first non-Jaccard sub-distance feature and a second non-Jaccard sub-distance feature; calculate a first sub-distance and a second sub-distance between the unknown malware and each individual known malware in the first subset, wherein the first sub-distance is based on the first non-Jaccard sub-distance features and the second sub-distance is based on the second non-Jaccard sub-distance features; calculate a Custom Distance Metric (CDM) for each individual known malware in the first subset by combining the first and the second sub-distances; identify, using the calculated CDM for each individual known malware in the first subset, a second subset of known malware that are most similar to the unknown malware; and classify the unknown malware based on the second subset of known malware.

Example 11 may include the subject matter of Example 10, and may further include one or more instructions that when executed by a processor, cause the processor to assign a remediation to the classified unknown malware.

Example 12 may include the subject matter of any of Examples 10 and 11, and may further specify that identifying the second subset of known malware includes selecting the known malware having the CDM that is equal to or less than a threshold.

Example 13 may include the subject matter of any of Examples 10-12, and may further specify that identifying the second subset of known malware includes selecting a number of known malware with the lowest CDM.

Example 14 may include the subject matter of any of Examples 10-13, and may further specify that classifying the known malware includes assigning a type, a family, an author, or a source location.

Example 15 may include the subject matter of any of Examples 10-14, and may further include one or more instructions that when executed by a processor, cause the processor to receive a unique identifier for the unknown malware; query an index of the MinHash LSH Forest using the unique identifier to determine whether the unknown malware is in the MinHash LSH Forest; and add the unknown malware to the MinHash LSH Forest based on a determination that the unknown malware is not in the MinHash LSH Forest.

Example 16 is a method, including: receiving a MinHash for an unknown malware sample; querying a MinHash Locality Sensitive Hashing (LSH) Forest using the MinHash for the unknown malware sample to identify a first set of similar samples, wherein the MinHash LSH Forest is based on a plurality of known malware samples, and wherein each known malware sample in the plurality of known malware samples includes a unique hashing identifier and a MinHash; receiving a first non-Jaccard distance-compatible feature and a second non-Jaccard distance-compatible feature for the unknown malware sample; receiving a first non-Jaccard distance-compatible feature and a second non-Jaccard distance-compatible feature for each known malware sample in the first set of similar samples; calculating a total distance between the unknown malware sample and each known malware sample in the first set of similar samples, wherein the total distance is a combination of a first distance and a second distance, and wherein the first distance is calculated using the first non-Jaccard distance-compatible features and the second distance is calculated using the second non-Jaccard distance-compatible features; identifying, based on the total distance for each known malware sample, a second set of similar samples; and classifying the unknown malware sample based on the second set of similar samples.

Example 17 may include the subject matter of Example 16, and may further include receiving a unique identifier of the classified unknown sample; querying an index of the MinHash LSH Forest using the unique identifier to determine whether the classified unknown sample is in the MinHash LSH Forest; and adding the classified unknown sample to the MinHash LSH Forest based on a determination that the classified unknown sample is not in the MinHash LSH Forest.

Example 18 may include the subject matter of any of Examples 16 and 17, and may further include assigning a remediation to the classified unknown sample.

Example 19 may include the subject matter of any of Examples 16-18, and may further specify that the first non-Jaccard distance-compatible features are Euclidean-type and the second non-Jaccard distance-compatible features are non-Euclidean-type.

Example 20 may include the subject matter of any of Examples 16-19, and may further specify that a number of known samples in the second set is between 10 and Example 25.

The invention claimed is:

1. An apparatus, comprising:
   a memory element operable to store instructions; and
   a processor operable to execute the instructions, such that the apparatus is configured to:
     receive a feature vector of an unknown sample, wherein the feature vector includes Jaccard-compatible properties, wherein at least a portion of the Jaccard-compatible properties include an operating system the unknown sample is designed to operate on, an indicator that indicates if the unknown sample is an executable file, and a type of file for the unknown sample, and non-Jaccard distance-compatible features where at least a portion of the non-Jaccard distance compatible features are numerical values;
     compute a MinHash of the unknown sample based on the Jaccard-compatible properties;
     query a MinHash Locality Sensitive Hashing (LSH) Forest of known samples with the MinHash of the unknown sample to identify a first subset of known samples that are similar to the unknown sample;
     receive, for each individual known sample in the first subset, a feature vector having non-Jaccard distance-compatible features;
     compute, for each individual known sample in the first subset, a first sub-distance between the unknown sample and the known sample using a first non-Jaccard distance-compatible feature and a second sub-distance between the unknown sample and the known sample using a second non-Jaccard distance-compatible feature;
     calculate, for each individual known sample in the first subset, an overall distance between the unknown sample and the known sample by combining the first and the second sub-distances;
     identify, based on the overall distance between the unknown sample and each individual known sample in the first subset, a second subset of known samples that are most similar to the unknown sample; and
     classify the unknown sample based on the second subset of known samples.

2. The apparatus of claim 1, further configured to:
   assign a remediation to the classified unknown sample.

3. The apparatus of claim 1, wherein the unknown sample and the known samples are malware.

4. The apparatus of claim 1, wherein identifying the second subset of known samples includes selecting the known samples having the overall distance that is equal to or less than a threshold.

5. The apparatus of claim 1, wherein identifying the second subset of known samples includes selecting a number of known samples with the lowest overall distance.

6. The apparatus of claim 1, wherein a number of known samples in the second subset is between 10 and 25.

7. The apparatus of claim 1, wherein a number of known samples in the first subset is between 250 and 500.

8. The apparatus of claim 1, wherein the first non-Jaccard distance-compatible feature is Euclidean-compatible and the second non-Jaccard distance-compatible feature is Hamming-compatible.

9. The apparatus of claim 1, further configured to:
   receive a unique identifier of the unknown sample;
   query an index of the MinHash LSH Forest using the unique identifier to determine whether the unknown sample is in the MinHash LSH Forest; and
   add the unknown sample to the MinHash LSH Forest based on a determination that the unknown sample is not in the MinHash LSH Forest.

10. At least one non-transitory computer-readable medium comprising one or more instructions that when executed by a processor, cause the processor to:
   receive a feature vector of an unknown malware, wherein the feature vector includes Jaccard-compatible properties, wherein at least a portion of the Jaccard-compatible properties include an operating system the unknown malware is designed to operate on, an indicator that indicates if the unknown malware is an executable file, a type of file for the unknown malware, and/or an indicator that indicates if the unknown malware is packed or unpacked, a first non-Jaccard sub-distance feature, and a second non-Jaccard sub-distance feature;
   compute a MinHash of the unknown malware;
   identify a first subset of known malware, wherein identifying the first subset includes querying a MinHash Locality Sensitive Hashing (LSH) Forest of known malware with the MinHash of the unknown malware;
   receive a feature vector for each individual known malware in the first subset, wherein the feature vector includes a first non-Jaccard sub-distance feature and a second non-Jaccard sub-distance feature;
   calculate a first sub-distance and a second sub-distance between the unknown malware and each individual known malware in the first subset, wherein the first sub-distance is based on the first non-Jaccard sub-distance features and the second sub-distance is based on the second non-Jaccard sub-distance features;
   calculate a Custom Distance Metric (CDM) for each individual known malware in the first subset by combining the first and the second sub-distances;

identify, using the calculated CDM for each individual known malware in the first subset, a second subset of known malware that are most similar to the unknown malware; and classify the unknown malware based on the second subset of known malware.

11. The at least one non-transitory computer-readable medium of claim 10, further comprising one or more instructions that when executed by a processor, cause the processor to:

assign a remediation to the classified unknown malware.

12. The at least one non-transitory computer-readable medium of claim 10, wherein identifying the second subset of known malware includes selecting the known malware having the CDM that is equal to or less than a threshold.

13. The at least one non-transitory computer-readable medium of claim 10, wherein identifying the second subset of known malware includes selecting a number of known malware with the lowest CDM.

14. The at least one non-transitory computer-readable medium of claim 10, wherein classifying the known malware includes assigning a type, a family, an author, or a source location.

15. The at least one non-transitory computer-readable medium of claim 10, further comprising one or more instructions that when executed by a processor, cause the processor to:

receive a unique identifier for the unknown malware;

query an index of the MinHash LSH Forest using the unique identifier to determine whether the unknown malware is in the MinHash LSH Forest; and add the unknown malware to the MinHash LSH Forest based on a determination that the unknown malware is not in the MinHash LSH Forest.

16. A method, comprising:

creating a MiniHash of an unknown malware sample based on a feature vector of the unknown malware sample, wherein the feature vector includes Jaccard-compatible properties and at least a portion of the Jaccard-compatible properties include an operating system the unknown malware is designed to operate on, an indicator that indicates if the unknown malware is an executable file, a type of file for the unknown malware, and an indicator that indicates if the unknown malware is packed or unpacked, receiving a MinHash for an unknown malware sample;

querying a MinHash Locality Sensitive Hashing (LSH) Forest using the MinHash for the unknown malware sample to identify a first set of similar samples, wherein the MinHash LSH Forest is based on a plurality of known malware samples, and wherein each known malware sample in the plurality of known malware samples includes a unique hashing identifier and a MinHash;

receiving a first non-Jaccard distance-compatible feature and a second non-Jaccard distance-compatible feature for the unknown malware sample;

receiving a first non-Jaccard distance-compatible feature and a second non-Jaccard distance-compatible feature for each known malware sample in the first set of similar samples;

calculating a total distance between the unknown malware sample and each known malware sample in the first set of similar samples, wherein the total distance is a combination of a first distance and a second distance, and wherein the first distance is calculated using the first non-Jaccard distance-compatible features and the second distance is calculated using the second non-Jaccard distance-compatible features;

identifying, based on the total distance for each known malware sample, a second set of similar samples; and classifying the unknown malware sample based on the second set of similar samples.

17. The method of claim 16, further comprising:

receiving a unique identifier of the classified unknown malware sample;

querying an index of the MinHash LSH Forest using the unique identifier to determine whether the classified unknown malware sample is in the MinHash LSH Forest; and adding the classified unknown malware sample to the MinHash LSH Forest based on a determination that the classified unknown malware sample is not in the Min-Hash LSH Forest.

18. The method of claim 16, further comprising:

assigning a remediation to the classified unknown malware sample.

19. The method of claim 16, wherein the first non-Jaccard distance-compatible features are Euclidean-type and the second non-Jaccard distance-compatible features are non-Euclidean-type.

20. The method of claim 16, wherein a number of known samples in the second set is between 10 and 25.

* * * * *

UNITED STATES PATENT AND TRADEMARK OFFICE
CERTIFICATE OF CORRECTION

PATENT NO. : 11,616,797 B2
APPLICATION NO. : 16/863806
DATED : March 28, 2023
INVENTOR(S) : Lancioni et al.

It is certified that error appears in the above-identified patent and that said Letters Patent is hereby corrected as shown below:

In the Claims

In Column 19, Claim 16, Line 36, delete "MiniHASH" and insert -- MinHASH --, therefor.

Signed and Sealed this
Fourth Day of July, 2023

Katherine Kelly Vidal
*Director of the United States Patent and Trademark Office*